(12) United States Patent
Greene et al.

(10) Patent No.: US 9,230,006 B2
(45) Date of Patent: Jan. 5, 2016

(54) REMOTE ACCESS TO TRACKING SYSTEM CONTACT INFORMATION

(75) Inventors: Geoffrey D. Greene, Dover, MA (US); Arthur L. P. Papas, Weston, MA (US); William Mirie Kimeria, Arlington, MA (US); Richard L. Leeds, III, Natick, MA (US)

(73) Assignee: Bullhorn, Inc., Boston, MA (US)

( * ) Notice: Subject to any disclaimer, the term of this patent is extended or adjusted under 35 U.S.C. 154(b) by 298 days.

(21) Appl. No.: 12/894,767

(22) Filed: Sep. 30, 2010

(65) Prior Publication Data
US 2012/0084313 A1    Apr. 5, 2012

(51) Int. Cl.
*G06F 17/30* (2006.01)

(52) U.S. Cl.
CPC .................. *G06F 17/30589* (2013.01)

(58) Field of Classification Search
CPC .................. G06F 17/30589; G06F 17/30525; G06F 17/30233; G06F 17/30318; G06F 17/30864
USPC .................................................. 707/754, 756
See application file for complete search history.

(56) References Cited

U.S. PATENT DOCUMENTS

| | | | |
|---|---|---|---|
| 6,356,892 B1 * | 3/2002 | Corn et al. | |
| 6,609,121 B1 * | 8/2003 | Ambrosini et al. | 707/763 |
| 6,708,170 B1 | 3/2004 | Byrne et al. | |
| 7,043,480 B2 | 5/2006 | Trivedi et al. | |
| 7,076,488 B2 | 7/2006 | Bollich et al. | |
| 8,660,967 B2 | 2/2014 | Vemuri | |
| 2006/0168344 A1 | 7/2006 | Tsuchiya et al. | |
| 2007/0266421 A1 * | 11/2007 | Vaidya et al. | 726/1 |
| 2008/0288599 A1 | 11/2008 | Kutchmark et al. | |
| 2010/0198804 A1 * | 8/2010 | Yaskin et al. | 707/706 |
| 2010/0217616 A1 * | 8/2010 | Colson et al. | 705/1.1 |

FOREIGN PATENT DOCUMENTS

| | | |
|---|---|---|
| JP | 2002/207767 | 9/2001 |
| JP | 2002-108683 | 12/2002 |

OTHER PUBLICATIONS

Fitzgerald, Steven, et al. "A directory service for configuring high-performance distributed computations." High Performance Distributed Computing, 1997. Proceedings. The Sixth IEEE International Symposium on. IEEE, 1997.*

(Continued)

*Primary Examiner* — Hosain Alam
*Assistant Examiner* — Nan Hutton
(74) *Attorney, Agent, or Firm* — Hamilton, Brook, Smith & Reynolds, P.C.

(57) ABSTRACT

In the context of tracking systems, it is difficult to ensure that an organization has a complete, accurate database of contacts stored in its tracking system. When tracking systems users are required to manage exporting and importing of contacts from their desktop mail clients and handheld devices, it is almost certain that contact information will not be kept up-to-date and that confidence in the accuracy of the contact information will not be high. By enabling a remote directory access portal in the tracking system, all users can be assured that they have available the latest contact information for the organizations' contacts. In addition to providing directory access, the tracking system can authenticate users and, based on the users' entitlements, authorize users' access to specific contacts.

17 Claims, 7 Drawing Sheets

(56) References Cited

OTHER PUBLICATIONS

Czajkowski, Karl, et al. "A resource management architecture for metacomputing systems." Job Scheduling Strategies for Parallel Processing. Springer Berlin Heidelberg, 1998.*

Allcock, Bill, et al. "Data management and transfer in high-performance computational grid environments." Parallel Computing 28.5 (2002): 749-771.*

Notification of Transmittal of the International Search Report and the Written Opinion of the International Searching Authority, or the Declaration for corresponding PCT/US2011/049550, mailed Apr. 17, 2012 (14 pages).

Notification Concerning Transmittal of Copy of International Preliminary Report on Patentability, International Application No. PCT/US2011/049550, Date of Mailing: Apr. 11, 2013.

Directory Server, Naoshi Ishii, Open Design, Japan, CQ Publishing Co. Ltd., Oct. 1, 1998, Issue 5, vol. 5 pp. 72-91.

Notification of Reason(s) for Rejection dated Jul. 28, 2015 of JP Application No. 2013-531588 entitled "Remote Access to Tracking System Contact Information".

* cited by examiner

REMOTE ACCESS TO TRACKING SYSTEM CONTACT INFORMATION

BACKGROUND OF THE INVENTION

Customer Relationship Management (CRM) refers to processes implemented by a company to handle its interactions with its contacts (e.g., customers). Generally, information can be accessed and entered into a CRM system by employees of the company. An Applicant Tracking System (ATS) is a software application that enables the electronic handling of corporate recruitment needs. If hosted and accessed over the Internet, these systems may be known as Software-as-a-Service (SaaS). As used herein, the terms "CRM," "ATS," "tracking application," and "tracking system" refer to any of these types of systems.

The business value of a tracking system is to enable a firm to improve its client interactions. This is done by collecting customer data and analyzing and measuring the data to understand customer needs and improve satisfaction, which leads to increased sales/placement opportunities. To effectively use the tracking system, all contact details, such as, for example, a contact's name, email, phone number, address, and other metadata about the contact is stored in the tracking system. When a user needs to call or send a message to a particular contact, the user typically looks up the contact's information in the tracking system. By using the tracking system as the organization's system of record, anyone needing to communicate with a contact can be assured that the information is the most up-to-date and accurate information. When the data changes (and is updated in the tracking system), such as, for example, a user's email address, phone number, or address, the next time any user with entitlement (e.g., permission) views the contact, that user will have the most accurate information. This ensures timely interactions with the organization's contacts to maximize business opportunities.

SUMMARY OF THE INVENTION

One problem with tracking systems today is that existing systems or methods require the user to log into the tracking system from a remote location using an application on the user's device to lookup contact details. The application used to log into the tracking application is separate from the user's client email application (e.g., Microsoft Outlook); thus, when the user looks up the contact information, the user must still either (1) copy-and-paste the email address from the tracking system into the remote client email application or (2) re-type the contact's email address from the information displayed by the tracking system application into the remote client email application. Many users find these extra steps to be a hassle. Because the steps needed to lookup a contact via tracking application login are viewed as being too time consuming, a user may elect to store all of his contact information locally. Many users perceive local storage of contact information as being better because searching and finding detailed contact information then becomes easier. This alternative to looking up the contact information via tracking application login involves exporting a list of contacts and associated details from the tracking system, and importing the information into the user's personal address book of his remote client email application. With this local storage method, the user is then responsible for ensuring that the contact information remains up-to-date when any changes are made to the contact information in the tracking system. When a user is required to manage the information between two applications in such a configuration, there is a high probability that the contact information will not be maintained consistently across the entire organization.

Various existing tracking systems have the ability to somewhat reduce the steps of the manual cut-and-paste method. Some systems require end users to install synchronization software and to manually tag contacts to download or store to their desktop mail client. With these systems, however, while the contact information is available locally on a user's desktop mail client, the contact information is not available to the user via a web-based mail client, and is also not available on the user's wireless handheld device.

Example methods and systems are disclosed herein to solve these problems. One example is a system for providing a remote client application with access to a tracking system directory. The system includes a data service that interfaces with the tracking system, and a Lightweight Directory Access Protocol (LDAP) server that interfaces with the remote client application. The system also includes a partition disposed between the data service and the LDAP server that processes a request from the remote client application. The partition formulates a command that is accepted by the data service based on the request. The partition then receives results from the data service in response to the command and translates the results into a format that is accepted by the remote client application.

In some embodiments, the request from the remote client application is a search query for contact information stored in the tracking system directory, and the results from the data service include contact information that matches the search query. The data service may generate the results by searching unstructured data in the tracking system directory. The data service can also validate credentials of a user of the remote client application before executing the command, and the results returned by the data service may be based on those credentials. For example, the data service can deny access to the tracking system directory based on the credentials, or filter the results passed back to the partition. In addition, the partition can construct a virtual directory structure from the results received from the data service, and may forward the results to the remote client application via the LDAP server.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The embodiments disclosed herein allow tracking system users to connect a remote mail application on a desktop or wireless handheld device to lookup and retrieve contact information directly from the tracking system. In many embodiments, when connected, a user can enter the name of a contact (or partial name), for example, and the email application sends a lookup query using the Lightweight Directory Access Protocol (LDAP) to the tracking system via a LDAP server. The contact name entered by the user may include "wildcard" symbols. Before the query is executed, the system may check the user's credentials for access to the tracking system, also known as "entitlements." Entitlement enforcement by the tracking system can allow or prevent the user from accessing certain contact information. Once the user is authenticated and entitlements are checked, the query is executed and the contact, or contacts if the query matches multiple contacts, is returned to the user's email application. The embodiments disclosed herein enable such remote access by installing a partition between a data service that interfaces with the tracking system and a LDAP server that interfaces with the remote client application, since the data service and LDAP server are likely not compatible.

Figure 1:
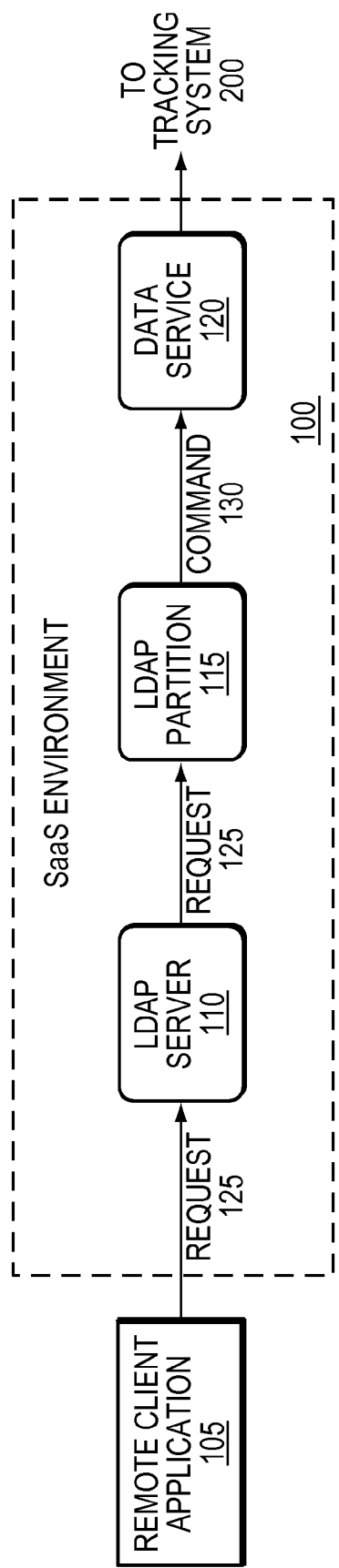
FIG. 1 is a block diagram illustrating the components of an example system for providing a remote client application with access to a tracking system directory, and illustrating submitting a search query to the tracking system.

FIG. 1 is a block diagram illustrating the components of an example system 100 for providing a remote client application 105 with access to a tracking system directory, and illustrating submitting a search query to the tracking system 200. The example system 100 includes a data service 120 that interfaces with the tracking system 200, and a LDAP server 110 that interfaces with the remote client application 105. The system 100 also includes a partition 115 disposed between the data service 120 and the LDAP server 110 that processes a request 125 from the remote client application 105. As shown, the request 125 may, for example, be or include a search query for contact information stored in the tracking system directory. Based on the request 125, the partition 115 formulates a command 130 that can be accepted by the data service 120.

Figure 2:
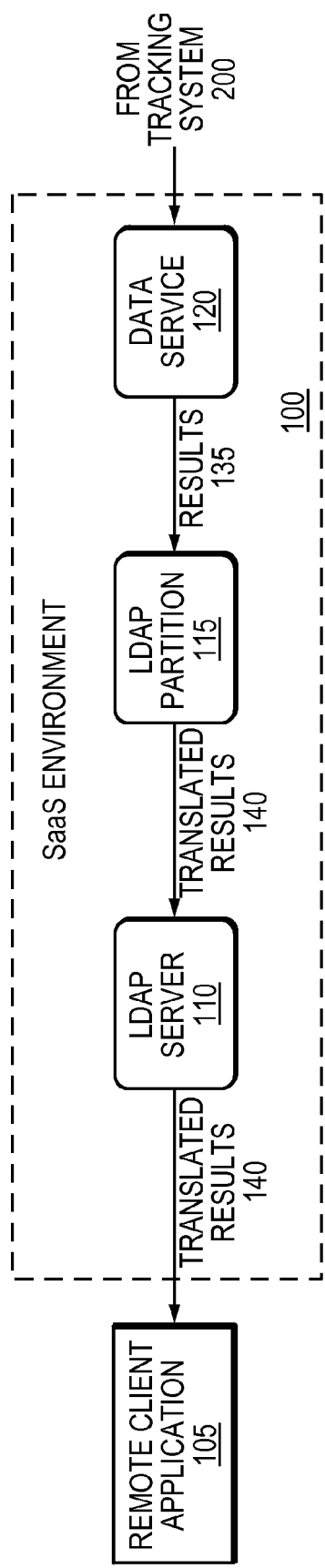
FIG. 2 is a block diagram illustrating the components of an example system for providing a remote client application with access to a tracking system directory, and illustrating receiving results of a search query.

FIG. 2 is a block diagram illustrating the components of the example system 100 of FIG. 1 and illustrating receiving results of a search query. The data service 120 may, upon receiving the command 130 (FIG. 1), generate results 135 by searching unstructured data in the tracking system directory, and the results 135 may include contact information that matches the search query. The partition 115 then receives results 135 from the data service 120 in response to the command 130 (FIG. 1) and translates the results 135 into a format that can be accepted by the remote client application 105. In doing so, the partition 115 may construct a virtual directory structure from the results 135, and may forward the translated results 140 to the remote client application 105 via the LDAP server 110. In some embodiments, before retuning results 135 to the partition 115, the data service 120 can validate the credentials of a user of the remote client application 105 before executing the command, and the results 130 returned by the data service 120 may be based on those credentials. For example, the data service 120 can deny access to the tracking system directory based on the credentials, or filter the results 135 passed back to the partition 115.

Figure 3:
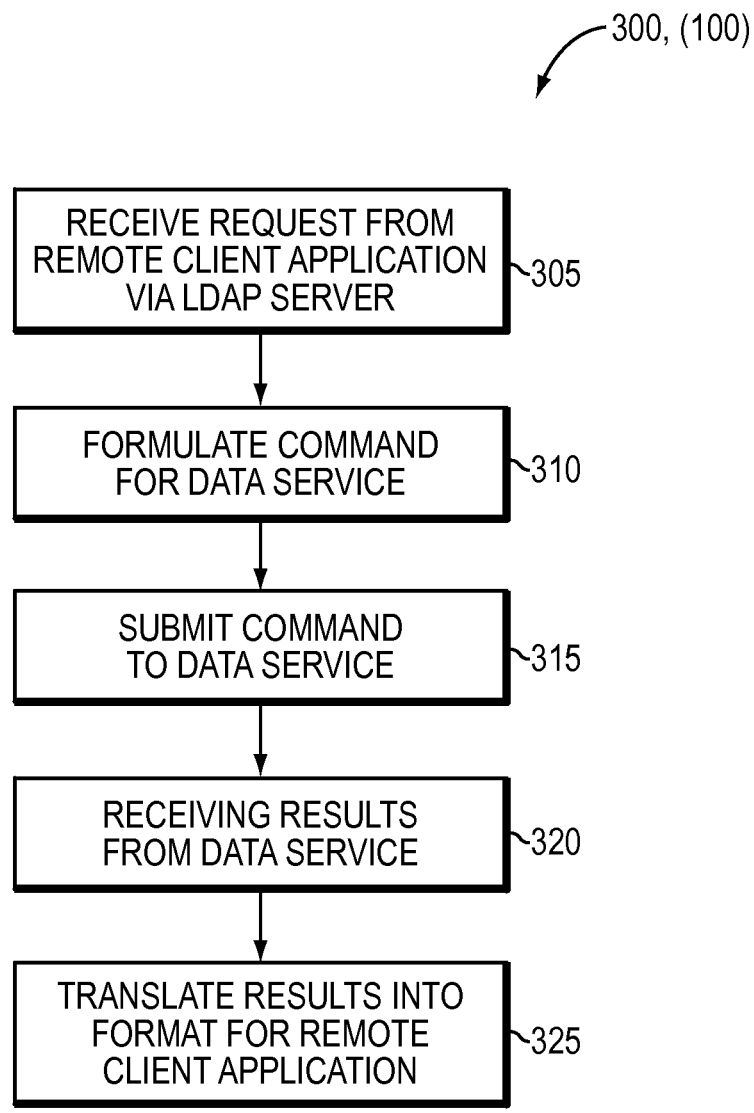
FIG. 3 is a flow chart illustrating an example embodiment's process for providing a remote client application with access to a tracking system directory.

FIG. 3 is a flow chart illustrating an example embodiment's process 300 for providing a remote client application with access to a tracking system directory. Upon receiving (305) a request 125 from the remote client application 105 via a LDAP server 110, a command 130 is formulated (310) based on the request 125. The request 125 may include, for example, a search query for contact information stored in the tracking system directory. The command 130 is of a format that can be accepted by a data service 120 that interfaces with the tracking system 200. The command 130 is then submitted (315) to the data service 120. If the request 125 included a search query, results 135 for the search may be generated by searching unstructured data in the tracking system directory, and may include contact information that matches the search query. In some embodiments, the credentials of a user of the remote client application 105 may be validated before executing the command 130, which can affect the generation of the results 135. For example, a user may be denied access to the tracking system directory, or the results 135 may be filtered based on the user's credentials. Upon receiving (320) results 135 from the data service 120 in response to the command 130, the results are translated (325) into a format accepted by the remote client application 105, which may include, for example, constructing a virtual directory structure from the results 135. The results 135 may then be forwarded to the remote client application 105 via the LDAP server 110.

Figure 4:
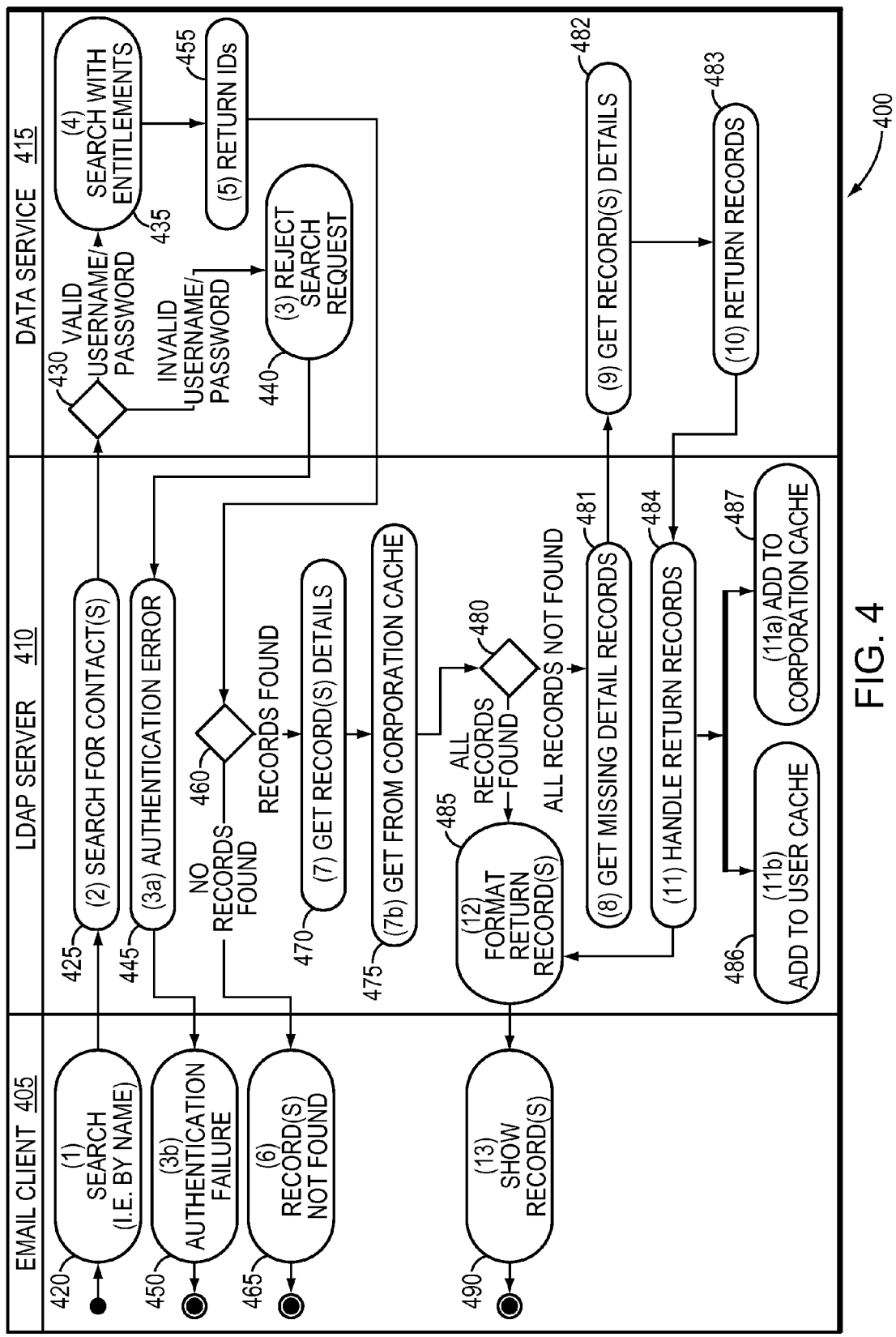
FIG. 4 is a detailed flow chart illustrating an example embodiment's process for searching for contact information stored in an tracking system and receiving records as a result of the search.

FIG. 4 is a detailed flow chart illustrating an example embodiment's process 400 for searching for contact information stored in an tracking system 200 and receiving records as a result of the search. According to the example process 400, a remote email client 405 submits (420) a search for a contact's name to an LDAP server 410 (e.g., a user of the email client 405 enters a search term and clicks search). In the example embodiment of FIG. 4, the partition 115 described above is incorporated into the LDAP server 410. The partition of the server 410 receives the search request, formulates (425) a search command, and submits the command to a data service 415.

When the data service 415 receives the command, it can validate (430) the credentials (e.g., username and password) of the email client user. If the credentials are invalid, the data service 415 generates (440) an authentication error and passes (445, 450) it back to the email client 405 via the LDAP server 410. Otherwise, the data service 415 performs (435) a search of the data stored in the tracking system 200, which can take into consideration the user's credentials (also called "entitlements"). If the search takes into consideration the user's entitlements, the user will only see records that they are entitled to access. After the search is performed, the data service 415 returns (455) records (e.g., contact information) that match the search command.

If no records are returned as a result of the search (460), the LDAP server 410 returns (465) a "records not found" message to email client 405. If, however, records are returned, the partition of the LDAP server 410 begins (470) the process of obtaining the details of the records. The partition first checks (475) a cache to determine whether the details of the particular records are in the cache. If all records are found (480) in the cache, the partition formats and returns (485) the record details to the email client 405, where the records are presented (490) to the user. If fewer than all of the records are found in the cache, the partition requests (481) from the data service 415 the details for the missing records. The data service 415 then obtains (482) the requested information and returns (483) the detailed information to the LDAP server 410. When received by the server 410, the partition handles (484) the returned information by adding (486, 487) the information to the appropriate caches, and formatting and returning (485) the record details to the email client 405. Upon receipt of the records, the email client 405 presents (490) the returned records to the user.

Figure 5:
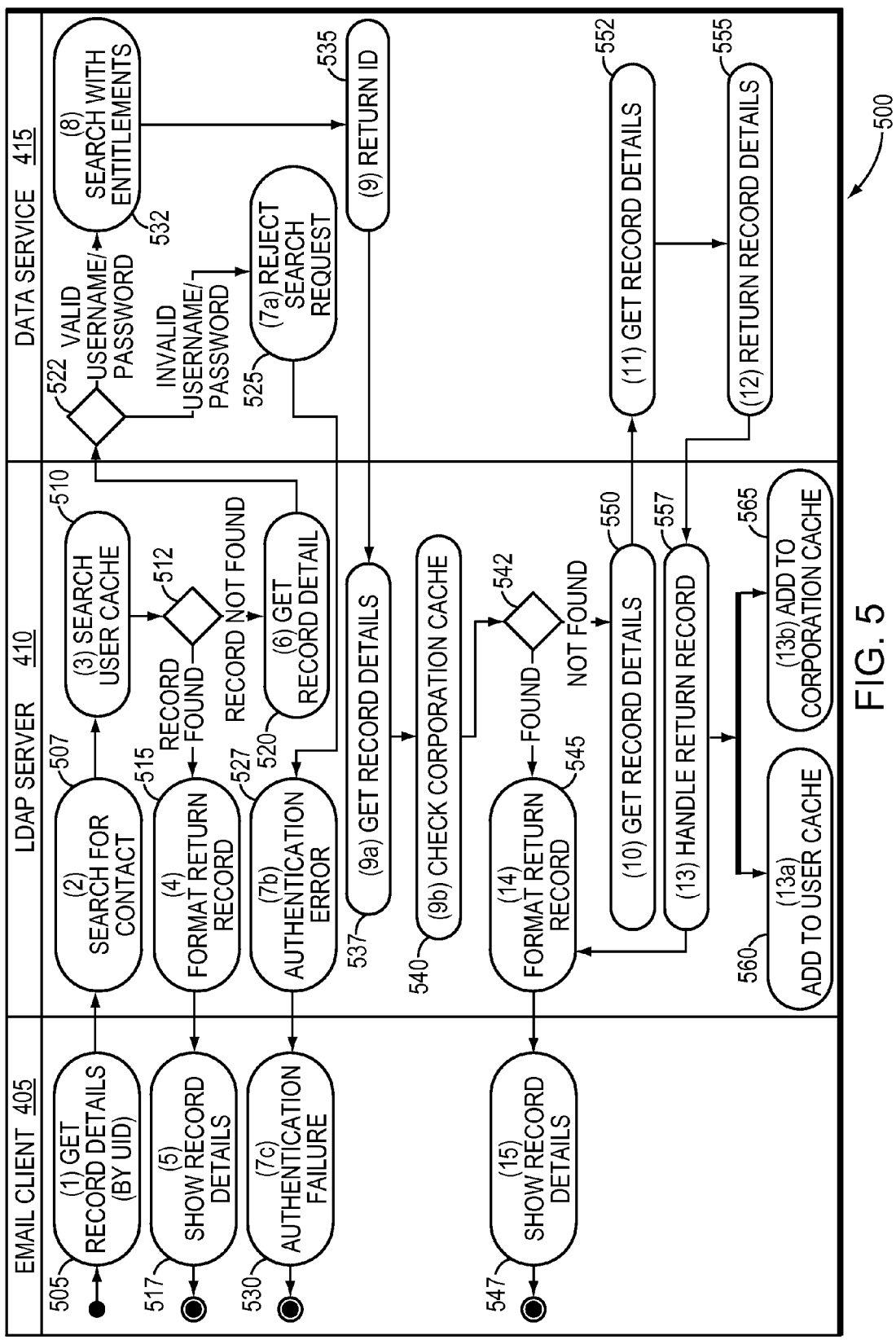
FIG. 5 is a detailed flow chart illustrating an example embodiment's process for requesting details for a particular contact stored in the tracking system and receiving detailed information as a result of the request.

FIG. 5 is a detailed flow chart illustrating an example embodiment's process 500 for requesting details for a particular contact stored in the tracking system 200 and receiving detailed information as a result of the request. According to the example process 500, the email client 405 requests (505) details for a given record (e.g., the user of the email client 405 clicks on a record to obtain its associated details). The request is sent (507) to the LDAP server 410, where the partition first checks (510) whether the requested information exists in a cache. If found (512) in the cache, the information is formatted and retuned (515) to the email client 405. However, if not found, the partition generates and sends (520) a command to the data service 415 to obtain the requested information.

As described above, the data service 415 can validate (522) the credentials of the email client user, and if the credentials are invalid, the data service 415 generates (525) an authentication error and passes (527, 530) it back to the email client 405 via the LDAP server 410. Otherwise, the data service 415 performs (532) a search of the data stored in the tracking system 200. If the search takes into consideration the user's entitlements, the user will only see a record if he is entitled to access the record. After the search is performed, the data service 415 returns (535) the record (e.g., contact information) that matches the search command.

The partition of the LDAP server 410 then begins (537) the process of obtaining the details of the record. The partition first checks (540) a cache to determine whether the details of the retuned record are in the cache. If the record is found (542) in the cache, the partition formats and returns (545) the record's details to the email client 405, where the details are presented (547) to the user. If the record is not found in the cache, the partition requests (550) from the data service 415 the details for the record. The data service 415 then obtains (552) the requested information and returns (555) the detailed information to the LDAP server 410. When received by the server 410, the partition handles (557) the returned information by adding (560, 565) the information to the appropriate caches, and formatting and returning (545) the record details to the email client 405.

Figure 6:
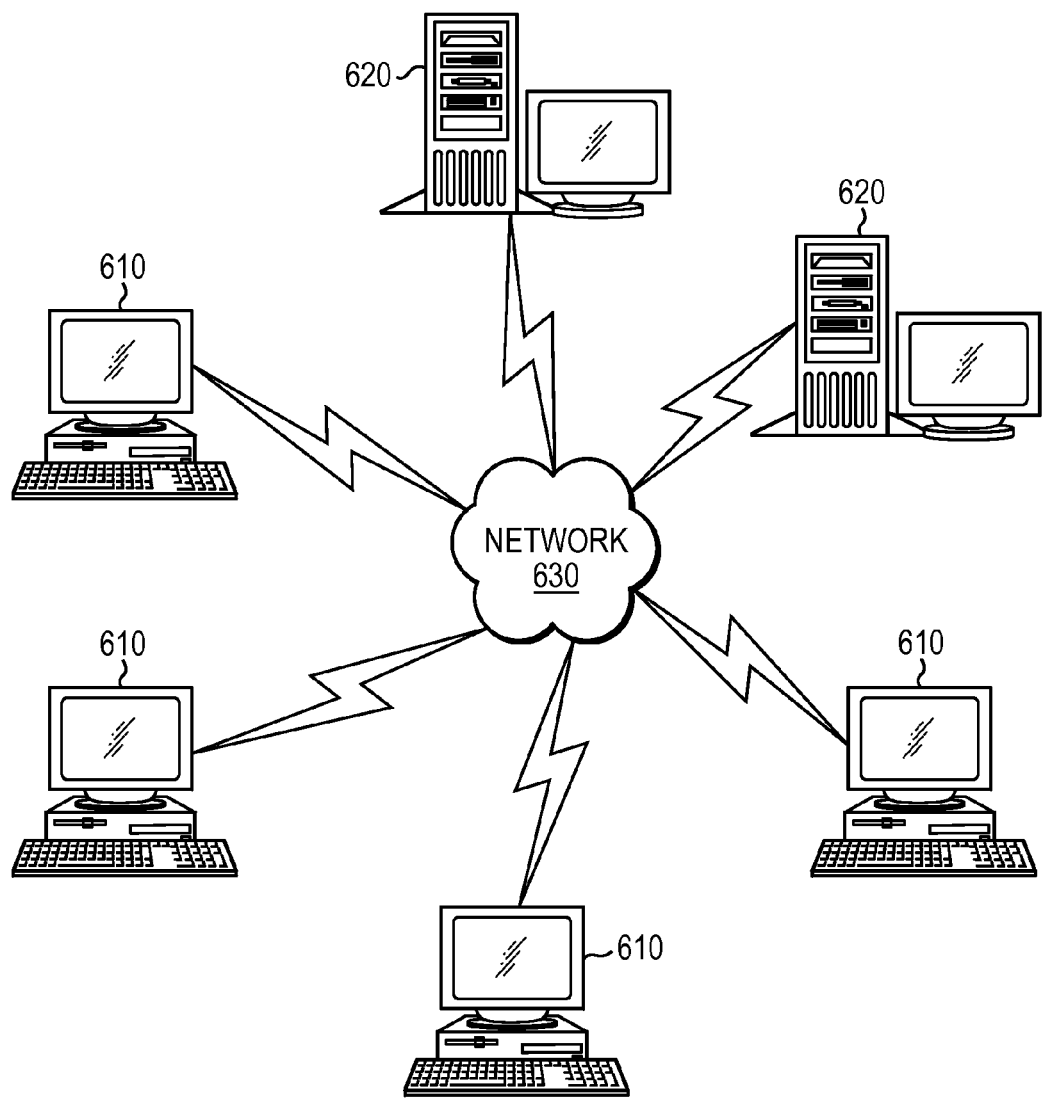
FIG. 6 is a schematic view of a computer network in which the example embodiments disclosed herein may operate.

FIG. 6 is a schematic view of a computer network in which embodiments of the present invention may operate. Client devices 610 and server devices 620 provide processing, storage, and input/output devices executing application programs and the like. Client devices 610 can also be linked through a communications network 630 to other computing devices, including other client devices 610 and server devices 620. The communications network 630 may be part of a remote access network, a global network (e.g., the Internet), a worldwide collection of computing devices, local area or wide area networks, and gateways that currently use respective protocols (TCP/IP, Bluetooth, etc.) to communicate with one another. Other electronic device/computer network architectures are also suitable.

Figure 7:
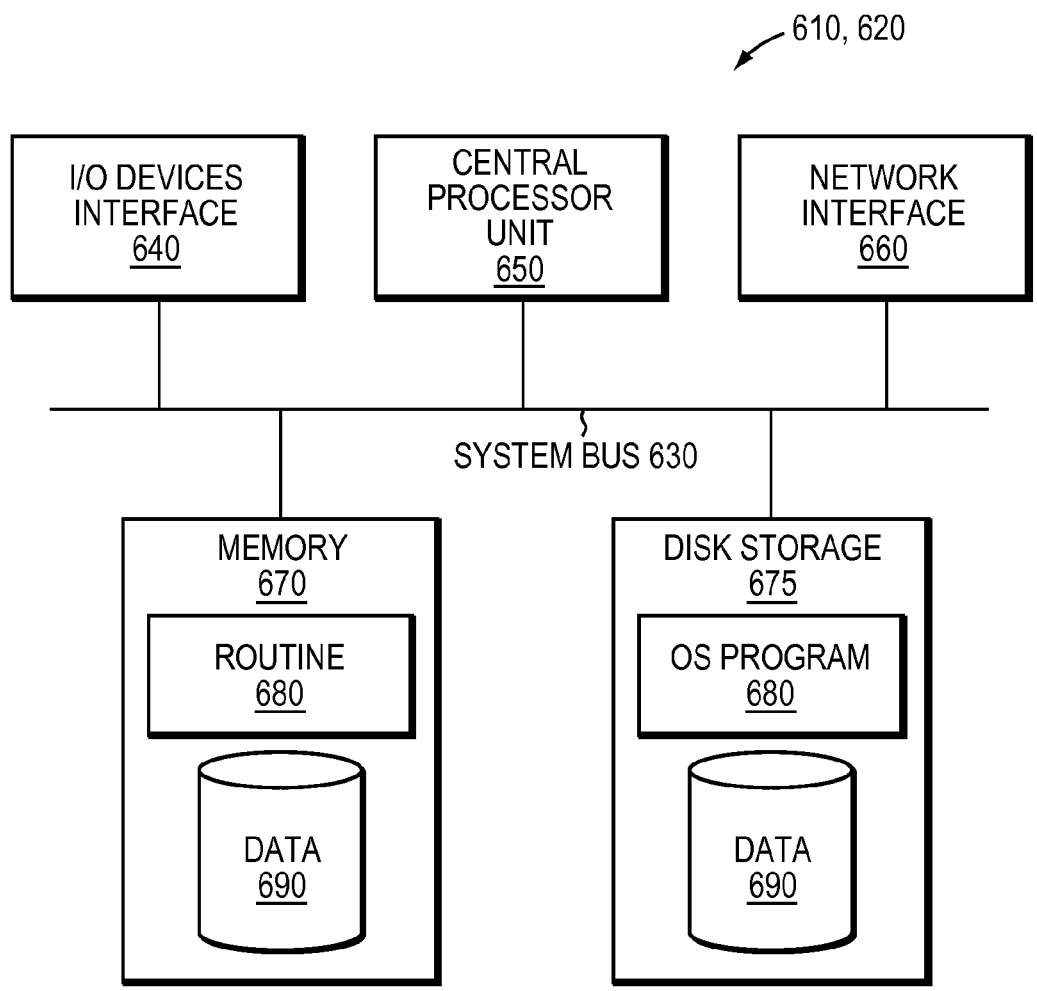
FIG. 7 is a block diagram of a computer node/device in the network of FIG. 6.

FIG. 7 is a block diagram of a computer node/device 610, 620 in the network of FIG. 6. Each device 610, 620 contains a system bus 730, where a bus is a set of hardware lines used for data transfer among the components of a device or processing system. The bus 730 is essentially a shared conduit that connects different elements of a device (e.g., processor, disk storage, memory, input/output ports, network ports, etc.) that enables the transfer of information between the elements. Attached to the system bus 730 is an I/O device interface 740 for connecting various input and output devices (e.g., keyboard, mouse, displays, printers, speakers, etc.) to the device 710, 720. A network interface 760 allows the device to connect to various other devices attached to a network (e.g., network 630 of FIG. 6). Memory 770 provides volatile storage for computer software instructions 780 and data 790 used to implement an embodiment of the present invention (e.g., data service 120, LDAP server 110, and partition 115 of FIGS. 1 and 2, and supporting code for performing the functions and processes 300, 400, and 500 detailed above in FIGS. 3-5). Disk storage 775 provides non-volatile storage for computer software instructions 780 and data 790 used to implement the methods and systems disclosed herein. Central processor unit 750 is also attached to the system bus 730 and provides for the execution of computer instructions.

In one embodiment, the processor routines 780 and data 790 are a computer program product (generally referenced 780), including a computer readable medium (e.g., a removable storage medium such as one or more DVD-ROM's, CD-ROM's, diskettes, tapes, or a portal server medium, etc.) that provides at least a portion of the software instructions for the invention system. Computer program product 780 can be installed by any suitable software installation procedure, as is well known in the art. In another embodiment, at least a portion of the software instructions may also be downloaded over a cable, communication and/or wireless connection.

While this invention has been particularly shown and described with references to example embodiments thereof, it will be understood by those skilled in the art that various changes in form and details may be made therein without departing from the scope of the invention encompassed by the appended claims.

What is claimed is:

1. A system for providing remote access to a tracking system directory, the system comprising:
    a data service executable by a computer and configured to interface with a tracking system, the tracking system having a tracking system directory storing up-to-date and accurate contact interaction information, and the tracking system enforcing entitlements that allow or prevent users from accessing respective contact information;
    a lightweight directory access protocol (LDAP) server executed by a digital processor and configured to interface with a remote email client application, the LDAP server and the data service being not compatible, and wherein the remote email client application is separate and distinct from a client application of the tracking system, and the remote email client application lacks access to local client downloaded data from the tracking system directory; and
    a partition module executed by a computer server and disposed between the data service and the LDAP server and configured to:
        (i) process a request from a user of the remote email client application,
        (ii) check whether information for responding to the request exists in a cache at the partition module,
        (iii) if the information is found in the cache, retrieve the information from the cache as search results, otherwise:
            (a) formulate a command accepted by the data service based on the request,
            (b) receive the search results from the data service in response to the command, wherein the data service interfaces with the tracking system to search data stored in the tracking system directory, and
(c) add the search results to the cache,
(iv) translate the search results into a format accepted by and useable in the remote email client application including for display to the user by the remote email client application, and
(v) forward the translated search results to the remote email client application, such that the remote email client application is provided data from the tracking system directory and thus effectively provided access to data of the tracking system directory, wherein the data service is responsive to the command formulated by the partition module based on the request and performs a search of the stored up-to-date and accurate contact interaction information in the tracking system directory taking into consideration entitlements of the user in the tracking system, including the data service validating credentials of the user for access to the tracking system directory before executing the formulated command, and the data service generating search results based on those credentials of the user.

2. A system as in claim 1 wherein the request from the remote email client application is a search query for contact information stored in the tracking system directory.

3. A system as in claim 2 wherein the search results from the data service include contact information that matches the search query.

4. A system as in claim 3 wherein the data service further generates the search results by searching unstructured data in the tracking system directory.

5. A system as in claim 1 wherein the data service denies access to the tracking system directory based on the credentials of the user.

6. A system as in claim 1 wherein the data service filters the search results based on the credentials of the user.

7. A system as in claim 1 wherein the partition module is further configured to forward the translated search results to the remote email client application via the LDAP server.

8. A system as in claim 1 wherein the partition module constructs a virtual directory structure from the search results received from the data service.

9. A method of providing remote access to a tracking system directory, the method comprising:
providing a partition module disposed between a data service and a lightweight directory access protocol (LDAP) server that are not compatible with each other the partition module being executed by a computer server, and at the partition module:
receiving a request from a user of a remote email client application via the lightweight directory access protocol (LDAP) server, the LDAP server being executed by a digital processor and configured to interface with the remote email client application, wherein a remote email client application is separate and distinct from a client application of a tracking system, and the remote email client application lacks access to local client downloaded data from a directory of the tracking system;
checking whether information for responding to the request exists in a cache at the partition module, and if the information is found in the cache, retrieve the information from the cache as search results, otherwise:
formulating, based on the request, a command accepted by the data service, the data service interfacing with the tracking system having the tracking system directory storing up-to-date and accurate contact interaction information, and the tracking system enforcing entitlements that allow or prevent users from accessing respective contact information;
submitting the formulated command to the data service;
receiving the search results from the data service in response to the formulated command, wherein the data service interfaces with the tracking system to search data stored in the tracking system directory; and
adding the search results to the cache;
translating the search results into a format accepted by and useable in the remote email client application including for display to the user by the remote email client application; and
forwarding the translated search results to the remote email client application, such that the remote email client application is provided data from the tracking system directory and thus effectively provided access to data of the tracking system directory;
wherein the data service is responsive to the formulated command based on the request and performs a search of the stored up-to-date and accurate contact interaction information in the tracking system directory taking into consideration entitlements of the user in the tracking system, including at the data service validating credentials of the user for access to the tracking system directory before executing the formulated command, and the data service generating search results based on those credentials of the user.

10. A method as in claim 9 wherein receiving a request from the remote email client application includes receiving a search query for contact information stored in the tracking system directory.

11. A method as in claim 10 wherein receiving search results from the data service includes receiving contact information that matches the search query.

12. A method as in claim 11 further comprising generating the search results by searching unstructured data in the tracking system directory.

13. A method as in claim 9 wherein validating the credentials of the user includes denying access to the tracking system directory.

14. A method as in claim 9 wherein validating the credentials of the user includes filtering the search results based on the credentials of the user.

15. A method as in claim 9 further comprising forwarding the translated search results to the remote email client application via the LDAP server.

16. A computer program product comprising:
a non-transitory computer readable medium having computer readable program codes embodied therein for providing remote access to a tracking system directory of a tracking system, the tracking system directory storing up-to-date and accurate contact interaction information, and the tracking system enforcing entitlements that allow or prevent users from accessing respective contact information; and
the computer readable program codes including instructions that, when executed by a processor, cause the processor to perform at least the following at a partition module disposed between a data service and a lightweight directory access protocol (LDAP) server, the LDAP server being configured to interface with a remote email client application:

check whether information for responding to a request received from a user of the remote email client application via the LDAP server exists in a cache at the partition module, and if the information is found in the cache, retrieve the information from the cache as results, otherwise:

formulate a command, based on the request, the formulated command being acceptable by the data service, the data service interfacing with the tracking system, the LDAP server and the data service being not compatible, and wherein the remote email client application is separate and distinct from a client application of the tracking system, and the remote email client application lacks access to local client downloaded data from the tracking system directory;

submit the formulated command to the data service;

receive the results from the data service in response to the formulated command, wherein the data service interfaces with the tracking system to search data stored at the tracking system; and add the results to the cache;

translate the results into a format accepted by and useable in the remote email client application including for display to the user by the remote email client application; and forward the translated results to the remote email client application, such that the remote email client application is provided data from the tracking system directory and thus effectively provided access to data of the tracking system directory;

wherein the data service is responsive to the formulated command based on the request and performs a search of the stored up-to-date and accurate contact interaction information in the tracking system directory taking into consideration entitlements of the user in the tracking system, including the data service validating credentials of the user for access to the tracking system directory before executing the formulated command, and the data service generating results based on those credentials of the user.

17. A method as in claim 9 further comprising constructing a virtual directory structure from the search results received from the data service.

* * * * *